United States Patent
Abrecht et al.

(10) Patent No.: US 9,472,347 B2
(45) Date of Patent: Oct. 18, 2016

(54) VARIABLE VACUUM CAPACITOR

(75) Inventors: Mike Abrecht, Thörishaus (CH); Roger Tanner, Liebefeld (CH); Mark Joachim Mildner, Rizenbach (CH); Philipp Jäggi, Zuchwil (CH); Walter Bigler, Heitenried (CH)

(73) Assignee: Comet AG, Flamatt (CH)

( * ) Notice: Subject to any disclaimer, the term of this patent is extended or adjusted under 35 U.S.C. 154(b) by 256 days.

(21) Appl. No.: 14/375,293

(22) PCT Filed: Feb. 3, 2012

(86) PCT No.: PCT/EP2012/051865
§ 371 (c)(1),
(2), (4) Date: Sep. 26, 2014

(87) PCT Pub. No.: WO2013/113401
PCT Pub. Date: Aug. 8, 2013

(65) Prior Publication Data
US 2015/0009603 A1    Jan. 8, 2015

(51) Int. Cl.
*H01G 5/38* (2006.01)
*H01G 5/14* (2006.01)
*H01G 5/011* (2006.01)

(52) U.S. Cl.
CPC ............. *H01G 5/145* (2013.01); *H01G 5/011* (2013.01); *H01G 5/14* (2013.01); *H01G 5/38* (2013.01)

(58) Field of Classification Search
CPC .................... H01G 5/38; H01G 5/14
See application file for complete search history.

(56) References Cited

U.S. PATENT DOCUMENTS

| | | | | |
|---|---|---|---|---|
| 3,101,622 A | * | 8/1963 | Johnson | F15B 7/08 361/300 |
| 3,270,259 A | * | 8/1966 | Oeschger | H01G 5/01 174/140 R |
| 3,611,075 A | | 10/1971 | Lindsay | |
| 3,618,186 A | * | 11/1971 | Krefft | H01G 4/02 29/25.41 |
| 6,473,289 B1 | * | 10/2002 | Weisse | H01G 5/14 361/278 |
| 2005/0052820 A1 | | 3/2005 | Jareiss et al. | |
| 2005/0133481 A1 | * | 6/2005 | Takahashi | H01G 5/14 218/135 |
| 2005/0264974 A1 | * | 12/2005 | Takahashi | H01G 5/014 361/277 |
| 2010/0254066 A1 | * | 10/2010 | Takahashi | H01G 5/014 361/272 |

OTHER PUBLICATIONS

International Search Report (Nov. 16, 2012) for corresponding International Application PCT/EP2012/051865.
Patent Abstracts of Japan and Machine Translation for JP10-284347 (Oct. 23, 1998) Meidensha Corp.

* cited by examiner

*Primary Examiner* — Dion R Ferguson
(74) *Attorney, Agent, or Firm* — WRB-IP LLP

(57) ABSTRACT

A variable vacuum capacitor includes two pairs of electrodes ganged together in series such that no moving parts are required to connect electrically to any static pans. Two sets, or gangs, of movable electrodes are connected mechanically and electrically together such that they move together and such that they require no electrical connection to any other part of the device. The ganged arrangement means that the device can be constructed with a smaller diameter, but without significantly increasing the overall length of the device.

14 Claims, 3 Drawing Sheets

VARIABLE VACUUM CAPACITOR

BACKGROUND AND SUMMARY

The present invention relates to the field of variable vacuum capacitors and in particular, but not exclusively, to motorized variable vacuum capacitors.

Vacuum capacitors typically consist of or comprise a vacuum-tight enclosure and a capacitance generating arrangement of conductive surfaces (electrodes) inside the vacuum-tight enclosure. The inner volume is pumped down to a very low pressure (typically lower than 10-6 mbar) and kept low over the entire lifetime of the device (typically years) by the vacuum-tight enclosure. The vacuum ensures rood electrical insulation between the electrodes and very low dielectric losses of the device.

The vacuum-tight enclosure is typically made of two conductive collars (which also serve as the electrical terminals of the device), attached in a vacuum-tight manner to an insulating piece (often a cylindrical-shaped ceramic piece). A vacuum capacitor can be fixed (ie no adjustment of the capacitance value is possible after manufacturing), or it can be made into a variable vacuum capacitor in which the capacitance value can be varied, which is typically achieved by moving one electrode with respect to the other by means of an expansion joint (a bellows, for example). The expansion joint is typically driven by a drive system which also includes a motor and some form of control mechanism. The motor is often constructed as a separate addition to the variable vacuum capacitor. However, a variable vacuum capacitor cannot function without such a means of driving and controlling the variable electrode (and hence the capacitance value).

Most common applications of variable vacuum capacitors include broadcasting (in an oscillation circuit of a high power transmission), as well as plasma controlling processes in the semiconductor, solar and flat panel manufacturing equipment (in so-called impedance matching networks). The adjustment of the capacitance value of a variable vacuum capacitor allows modifying and matching a power supply's output impedance to the application's impedance value.

Any part of an electrical circuit responds to the amplitude and phase of an alternative (AC) current. That response (i.e. how it changes the amplitude and/or phase of the current) is described by the impedance which is (in mathematical terms) a complex number made out of a real part and an imaginary part.

High frequency power supplies are manufactured to have standardized impedance values. The standard impedance is 50 Ohms.

High frequency applications (such as plasma processes) called the "loads" of the circuit, can have any impedance value (a+bj) where a and b can be any real numbers and j is defined as the mathematical number whose square equals −1. Typical semiconductor, solar, or flat panel manufacturing require a succession of various plasma processes, which translates into varying load impedances that must be continuously and dynamically matched to the fixed impedance of the power supply.

In impedance matching networks, the function of the variable vacuum capacitor is therefore to equate the following relations at all times (for all loads generated by the applications):

$$Z\text{power supply} = Z\text{matching network}(C, \ldots) + Z\text{load},$$
for any (time-varying) load $$50+0j = Z\text{matching network}(C, \ldots) + a+jb, \text{for any } a,b$$
values of a time-varying load Where Z designates the complex impedance values of the high-frequency circuit part (the part is indicated as an index).

The impedance of the matching network Zmatching network(C, . . . ) is a function of the capacitance value C of the variable vacuum capacitor, and can also be a function of other components of the matching network, such as inductive, or resistive, or other capacitive components.

If the load is not properly matched at all tunes, the electrical power from the supply is not well transmitted into the load. Unwanted consequences include energy dissipation or energy reflected back into the power supply which can lead to its destruction. By appropriately adjusting the value of the variable vacuum capacitor, the impedance of the matching network can be tuned for optimum power transfer from the power supply to the load.

The means of moving the movable electrode (sometimes also called the "variable electrode") can be a separate addition to the device or can be integrated into the device. When integrated, the variable vacuum capacitor is sometimes explicitly referred to as a "motorized variable vacuum capacitor" In any case when comparing the size or speed or other characteristic of the variable vacuum capacitor device, one should always consider the entire system made of "motor ±variable capacitor device", as both are required in applications.

Known variable vacuum capacitors typically have a bellows which must serve three functions: it must provide a reliable vacuum seal, it must be capable of extending and contracting to allow movement of the movable electrodes, and it must also carry the electrical high-frequency current from the terminal to the movable electrode. This limits the choice of material for the bellows to very few options, as it must be optimized simultaneously for electrical characteristics and for mechanical characteristics. Even with a good choice of material, the long path of the electrical current along the bellows (high-frequency currents are forced to flow along the surface of conductors, a phenomenon known as "skin effect") can result in considerable electrical losses inside a very critical part of the device, therefore generating undesired heat and an additional parasitic electrical resistance to the capacitive device. Such elevated temperatures and thermal cycling will reduce the total number of duty cycles of the expansion joint, thereby reducing the operating lifetime of the variable vacuum capacitor.

Japanese patent application JP10284347A proposed a variable vacuum capacitor which makes use of two bellows to mitigate the aforementioned inconvenience. Patent document U.S. Pat. No. 6,473,289 (B1), on the other hand, proposed to eliminate the bellows completely and substitute its fictions with other parts and a different layout of electrodes inside the vacuum enclosure.

Patent application US2005052820A, from the present applicant, proposed the use of two series-connected sets of electrodes arranged adjacent to each other in the radial direction. This arrangement results in a rather large diameter device, because a large space in needed in the plane perpendicular to the movement of the variable electrode (to achieve a reasonably high capacitance value). Such a design is discussed in more detail below, with reference to FIG. 2.

A variable vacuum capacitor described in patent application U.S. Pat. No. 3,611,075 A suffers from the same disadvantage, namely that the two fixed electrodes and the two variable electrodes are positioned next to one another in the radial direction. For a given diameter of the device, the capacitance that can be achieved is thus inferior in those prior designs which do not use series-connected electrode sets. Another inconvenience of these devices disclosed in US2005052820A and U.S. Pat. No. 3,611,075 is that, because the electrode radii of the inner set of electrodes are substantially different from the radii of the outer set of electrodes, it is difficult to manufacture the outer and inner electrode sets to have equal capacitance. One must for example adapt the number of turns and/or the length of the inner electrodes as compared to those of the outer electrode.

A further inconvenience of many prior art variable vacuum capacitors is that the motor must be well insulated from the movable electrodes, because the motor is mounted on or near a high voltage terminal of the device. To avoid high voltage discharges from that terminal on to the motor, and to avoid other electrical, interference between the high voltage terminal and the much lower voltage of the motor it is necessary to use a long insulating part, which adds significantly to the overall size of the device.

The variable vacuum capacitor of an aspect of the invention aims to address these and other problems with prior art devices. It is desirable to provide a variable vacuum capacitor having:

an increased serviceable lifetime, improved voltage and current handling characteristics as compared to those obtained with prior art devices having similar size and capacitance, and/or a smaller diameter and/or length (eg having capacitive electrodes which can fit into a smaller cylindrical volume with small cylindrical diameter).

In particular, an aspect of the invention foresees a variable vacuum capacitor comprising:

a vacuum enclosure, a first variable electrode assembly comprising one or more first static electrodes and one or more first mobile electrodes, a second variable electrode assembly comprising one or more second static electrodes and one or more second mobile electrodes, a first electrical connection terminal for providing an electrical connection to the one or more first static capacitor electrodes, a second electrical connection terminal for providing an electrical connection to the one or more second static capacitor electrodes, displacement means for displacing the first and/or second mobile electrodes relative to the first and/or second static electrodes respectively, along an axis of the vacuum capacitor, the variable vacuum capacitor being characterized in that the first and second electrode assemblies are ganged along the axis such that the first mobile electrode assembly is offset along the axis by a gang offset distance from the second electrode assembly, and the variable vacuum capacitor comprises mobile electrode linkage means for providing a kinematic linkage between the one or more first mobile electrodes at a first position along the axis and the one or more second mobile electrodes at a second position along the axis, such that a first displacement of the one or more first mobile electrodes along the axis results in a second displacement of the one more second mobile electrodes along the axis.

By arranging the first and second electrode assemblies in to linearly ganged configuration, the diameter of the device can be significantly reduced. It is also possible to avoid the need for any electrical connection to any moving parts such as the mobile electrodes, which means that the bellows are not required to act as electrical conductors and can be made of a material which is more suited to the mechanical function. This in turn can significantly extend the working life of the device.

According to a variant of the variable vacuum capacitor of an aspect of the invention, the mobile electrode linkage means is arranged such that the magnitude of the second displacement is the same as the magnitude of the first displacement. The mobile electrode linkage means can for example be a simple, rigid structure which provides a direct mechanical link between the two sets of mobile electrodes, thus enabling a simple and robust construction and reducing the possibility of stray capacitance due to the linkage geometry.

According to another variant of the variable vacuum capacitor of an aspect of the invention, the mobile electrode linkage means comprises electrical connection means for electrically connecting the one or more first mobile electrodes to the one or more second mobile electrodes. Combining the two functions of mechanically and electrically connecting the mobile electrodes further reduces the complexity of the device.

According to another variant of the variable vacuum capacitor of an aspect of the invention, the displacement means comprises a motor outside the vacuum enclosure, and drive transmission means for transmitting a drive force of the motor through a wall of the vacuum enclosure to the on or more first mobile electrodes inside the vacuum enclosure. Since the bellows and the outer surface of the device is insulated from the electrodes, the motor can be mounted much closer to the device (eg on the outer surface of the wall of the vacuum enclosure), which can significantly reduce the overall size of the device.

According to another variant of the variable vacuum capacitor of the an aspect of invention, motor protection insulation can be included to electrically insulate the motor against a high voltage on the one or more first mobile electrodes.

According to another variant of the variable vacuum capacitor of the an aspect of invention, the motor protection insulation is arranged between the drive transmission means and the one or more first mobile electrodes.

According to another variant of the variable vacuum capacitor of the an aspect of invention, the one or more first mobile electrodes and the one or more first static electrodes are substantially cylindrical and coaxial with the axis, such that the one or more first mobile, electrodes are at least partially interleaved with the one or more first static electrodes, and/or the second mobile electrodes and the one or more second static electrodes are substantially cylindrical and coaxial with the axis, such that the one or more second mobile electrodes are at least partially interleaved with the one or more second static electrodes.

According to another variant of the variable vacuum capacitor of an aspect of the invention, the one or more first mobile electrodes and the one or more first static electrodes are configured as spiral electrodes, and/or wherein the one or more second mobile electrodes and the one or more second static electrodes are configured as spiral electrodes.

According to another variant of the variable vacuum capacitor of an aspect of the invention, the mobile electrode linkage means comprises a substantially cylindrical element arranged around the outside of the first electrode assembly and arranged coaxially with the one or more first mobile and one or more first static electrodes.

The substantially cylindrical element may be at least partially constructed from an electrode material and arranged sufficiently close to an outer one of the one or more first static electrodes to function at least partially as one of the one or more first mobile electrodes. This refinement offers a simple, robust structure which also contributes to an increase in the maximum variable capacitance of the device.

According to another variant of the variable vacuum capacitor of an aspect of the invention, the substantially cylindrical element comprises open regions, and wherein one or more static electrode support elements extend from the first static electrodes, through the openings, to the wall of the vacuum enclosure.

According to another variant of the variable vacuum capacitor of an aspect of the invention, its insulating parts are made at least partially of a ceramic material.

According to another variant of the variable vacuum capacitor of an aspect of the invention, extensible vacuum sealing means (eg bellows) extend between the first electrode assembly and the wall of the vacuum enclosure, the extensible vacuum sealing means being constructed with such a shape and of such materials that it behaves as an electrical insulator, at least when the variable vacuum capacitor is operating at a high voltage and/or at a high frequency.

According to another variant of the variable vacuum capacitor of an aspect of the invention, the one or more first static and the one or more first mobile electrodes have substantially the same dimensions and spatial configuration as the one or more second static and the one or more second mobile electrodes respectively. This variant has two principal benefits: firstly, that the manufacture of the device can be significantly simplified by only requiring tooling for one electrode configuration, and, secondly, that using identical or similar first and second electrode assemblies results in an even distribution of capacitance between the two assemblies, thereby minimising the voltage on the mobile electrodes, which means that the device can operate at a higher applied voltage.

BRIEF DESCRIPTION OF THE DRAWINGS

The invention will now be described in detail, with reference to the accompanying drawings, in which.

The figures are provided for illustrative purposes only, and should not be construed as limiting the scope of the claimed patent protection. Where the same references have been used in different drawings, they are intended to refer to similar or corresponding features. However, the use of different references does not necessarily indicate that the features to which they refer are different.

DETAILED DESCRIPTION

Figure 1:
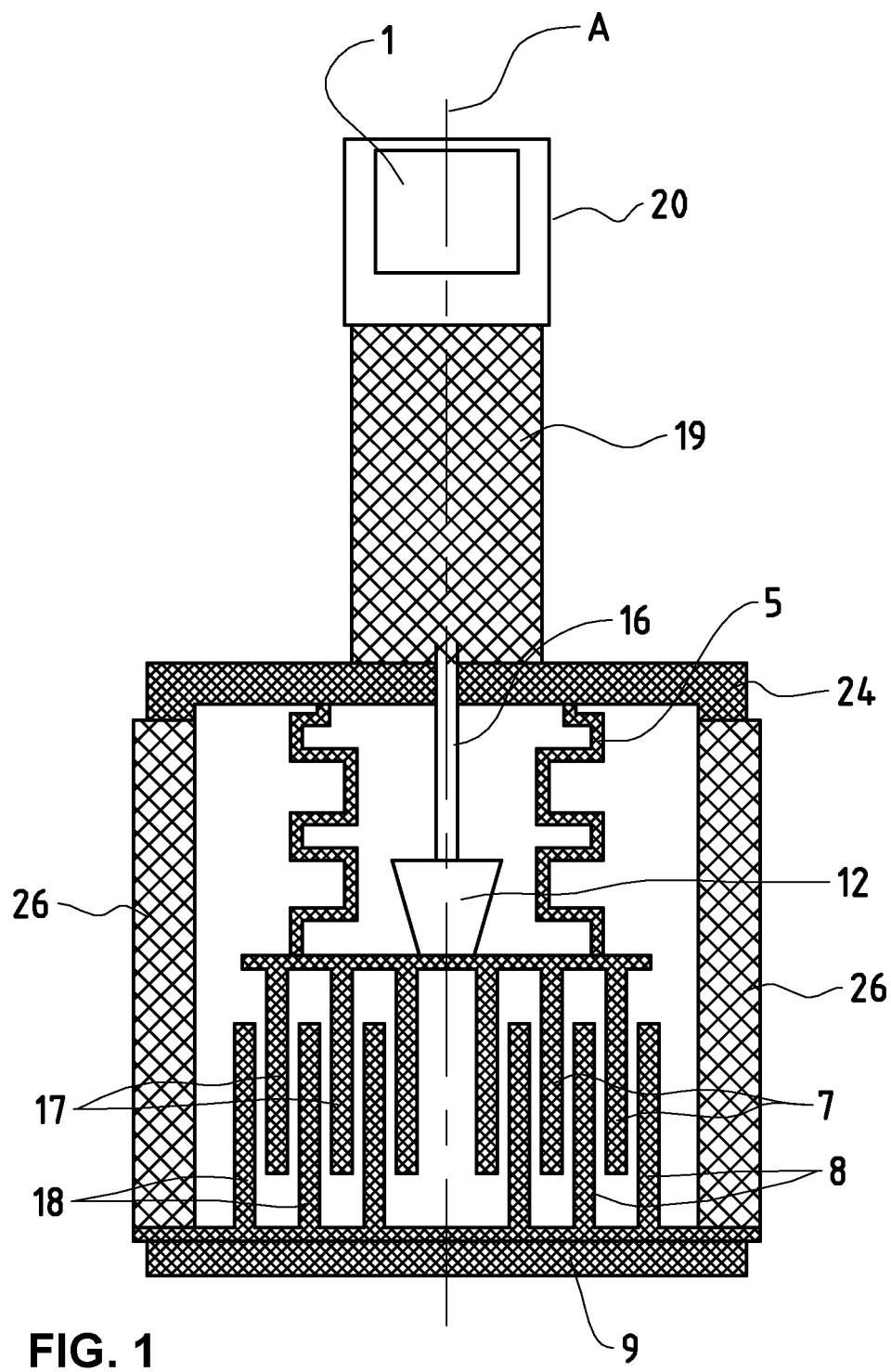
FIG. 1 shows in schematic, sectional view, a simple prior art variable vacuum capacitor having a single pair of electrodes.

FIG. 1 illustrates the configuration of a simple variable vacuum capacitor as known in the prior art. Such a vacuum capacitor typically consists of or comprises two conducting high voltage terminals, 24 and 9, attached to an insulating cylindrical vacuum enclosure wall, 26, in a vacuum-tight manner. Increasing the overlap area of electrodes, 7 and 8, and/or decreasing their separation, increases the capacitance value of the device. The electrodes 7 and 8 are conductively attached to the terminals 24 and 9 respectively. In order to vary the capacitance of the variable vacuum capacitor device, one electrode, 7, is moved with respect to the other. This is typically achieved by means of an expansion joint (bellows, 5) and a drive system, 16, 12 whose motion is controlled by an electrical motor, 1, such as a stepper motor.

As mentioned above, the bellows 5 have a triple function: while transmitting the movement to the movable electrode, 7, they must also carry the electrical high-frequency current from the terminal, 24, to the movable electrode, 7, while also separating the vacuum from the chive system, which is at atmospheric pressure. This limits the choice of material for the bellows, 5, to very few options, as it must be optimized simultaneously for electrical characteristics and for mechanical characteristics. Even with a good choice of material, the long path of the electrical current along the bellows, 5, (high-frequency currents are forced to flow along the surface of conductors, a phenomenon known as "skin effect") can result in considerable electrical losses inside a very critical part of the device, thereby generating undesired heat and an additional parasitic electrical resistance to the capacitive device. Such elevated temperatures and thermal cycling will reduce the total number of cycles the expansion joint, 5, will work, thereby reducing the operating lifetime of the variable vacuum capacitor.

Figure 2:
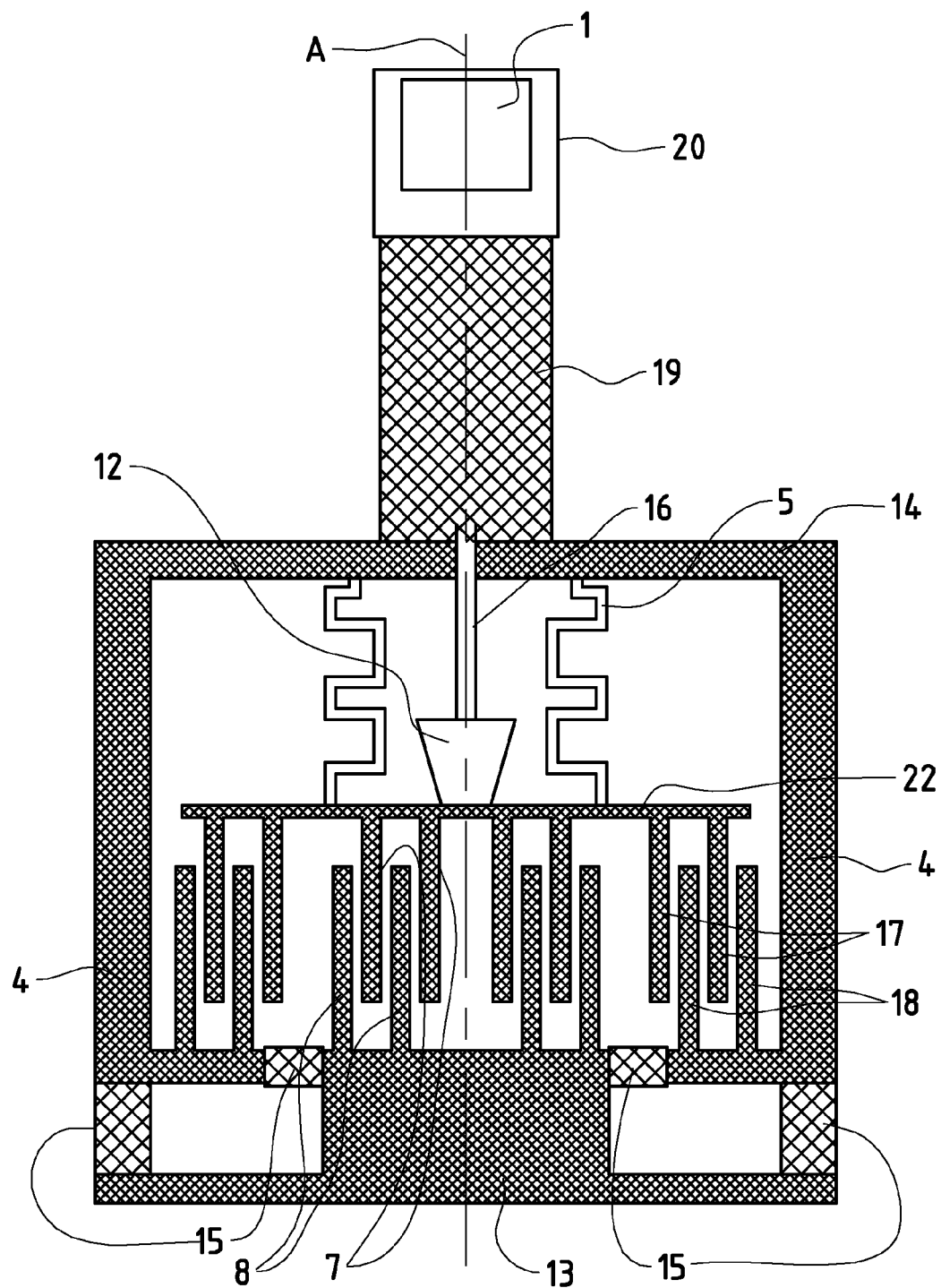
FIG. 2 shows in schematic, sectional view, a prior art variable vacuum capacitor have two sets of electrodes arranged electrically in series, and mechanically in parallel.

FIG. 2 shows a schematic representation of a series electrode arrangement known in the prior art (eg US2005052820 A1).

Two concentric electrode sets, 7, 8 and 17, 18 are arranged, one outside the other, in the same plane, with a common support element 22 supporting all the mobile electrodes 7, 17. To increase the capacitance, the height and number of the electrode surfaces must be increased, which means increasing the dimensions of the device. Alternatively, the spacing between the electrodes can be decreased, which leads to a lower maximum operating voltage of the device.

Connections to the variable vacuum capacitor are made at the end surfaces 13 and 14, which are connected internally to the static and mobile electrodes 18 and 17 respectively. The bellows, 5, are at least partially made of an insulating material such that no current can flow between the mobile electrodes 22, 17 and the upper terminal 14.

Figure 3:
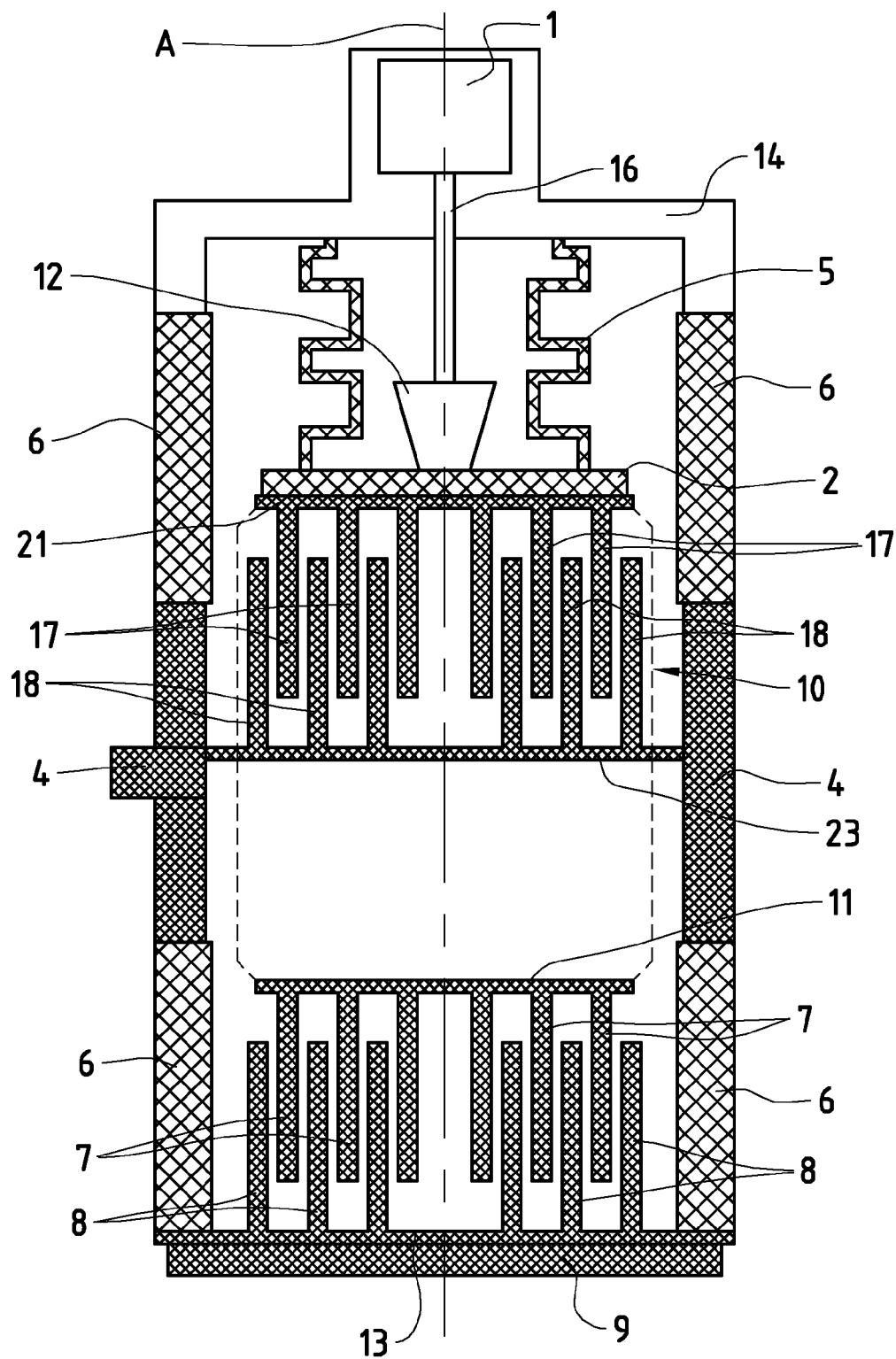
FIG. 3 shows in schematic, sectional view, an example of a variable vacuum capacitor according to an aspect of the invention, having two sets of electrodes arranged electrically and mechanically in series.

FIG. 3 shows an example of a variable vacuum capacitor according to an aspect of the invention. The required capacitance is generated by means of two electrode assemblies, 17, 18, 21, 23 and 7, 8, 11, 13. Each electrode assembly comprises one or more movable 7, 17 and one or more fixed 8, 18 electrodes. Each set of electrodes may be for example be constructed as one or more concentric cylinders or as a spiral having one or more turns.

One set of static electrodes, 18, is shown supported by a support element, 23, secured to the wall 4 of the vacuum enclosure. The other set of static electrodes, 8, is shown supported by the end cap 13 of the vacuum capacitor and the end terminal 9.

One mobile sets of electrodes 17 is shown supported by electrode support 21, which is in turn supported by insulator 2 and insulating, bellows 5 and motor drive 12, 16. Electrode support 21 is mechanically and electrically connected by a connecting means, 10, denoted by dashed line, to the electrode support 11 of the lower mobile electrodes 7. In the simple case, the connecting means may be a simple, rigid element such as a cylinder of copper. In this case, the wall of the cylinder is provided with openings so as to allow the cylinder 10 to move up and down parallel to the longitudinal axis A of the device without interfering with the electrode support 23, which has one or more arms or other support structures for securing to the wall 4 of the vacuum enclosure.

The series connection of the two electrode assemblies means that the current which flows to and from the terminals is obliged to follow a path which does not include any moving parts such as bellows. Moreover, instead of being at opposite ends of the variable vacuum capacitor, the two high voltage terminals of the device can be placed at or towards one end of the device, for example in a region at a mid-point along the length of the device at the lateral cylinder periphery.

Siting the terminal 4 at a mid-way point on the length of the vacuum enclosure also means that the current path from the terminal to the static electrodes 18 is short and direct, which in turn minimises unwanted EMC emissions and thermal dissipation.

In this way, the variable vacuum capacitor has an end portion 14 to which the motor assembly 1 can be mounted, at least a portion which is essentially free of the influence of the high voltages present at either end of a conventional variable vacuum capacitor.

FIG. 3 shows the motor mounting terminal 14 separated from the high voltage terminals 4 by an insulating vacuum enclosure part, 6. Because the bellows do not carry current, they also do not need to be electrically conducting, and therefore motor mounting terminal 14 is also insulated from the electrodes 7. Alternatively if one still uses a conducting bellows 5, then an insulating part 2 at either end of the bellows 5 would insulate the motor terminal 14 and motor 1 from the electrodes 7. Because this insulating part is in vacuum, it does not need to be as large as the motor-insulating part 19 used outside the vacuum in prior art (see FIGS. 1 and 2).

The advantage provided by being able to mount the motor directly on the vacuum capacitor enclosure makes the motorized variable vacuum capacitor of the present invention more compact and/or frees space to be filled with electrodes inside the vacuum. This is turn results in higher achievable capacitance values and higher achievable maximum operating voltages.

In FIG. 2, electrode pairs are shown mounted in series, co-axially, each electrode of each pair mounted one above the other along a single axis corresponding to the movement axis, A (there are no "inner" or "outer" electrodes, as there are in the device shown in FIG. 2), resulting in a small diameter (perpendicular the movement axis) similar to the devices of prior art not using a serial geometry (such as those of FIG. 1) and resulting in a smaller diameter as the devices of prior art using a serial geometry (such as those of FIG. 2).

At the same time, the voltage capability of a serial geometry is increased between the two high voltage terminals, 4 and 9, because the total voltage splits between the different pairs of electrodes in series. For example, in the example embodiment shown in FIG. 3, the voltage between the conducting surfaces 4 and 17 and the voltage difference between the conductive surfaces 7 and 9 are half the voltage difference applied across the terminals 4 and 9 of the variable vacuum capacitor. This voltage splitting, which is a consequence of mounting electrodes in series, is advantageous because it permits smaller electrode separation without risking voltage breakdowns in the vacuum; and thanks to the smaller electrode separation achievable, the capacitance value can be significantly increased.

In the example shown in FIG. 3, both movable electrodes 7 and 17 are shown connected by a conducting piece (10), preferably made of a good electrical conductor and preferably structured as a rigid tube-shaped part having a diameter similar but bigger than the outermost surface of the fixed electrode, therefore generating an additional capacitative contribution.

Note that only two pairs of electrodes are depicted in FIG. 3, but it will be understood that the invention also covers the use of multiple pairs of electrodes.

The invention claimed is:

1. A variable vacuum capacitor comprising:
   a vacuum enclosure,
   a first variable electrode assembly comprising one or more first static electrodes and one or more first mobile electrodes,
   a second variable electrode assembly comprising one or more second static electrodes and one or more second mobile electrodes,
   a first electrical connection terminal for providing an electrical connection to the one or more first static capacitor electrodes,
   a second electrical connection terminal for providing an electrical, connection to the one or more second static capacitor electrodes,
   displacement means for displacing the first and/or second mobile electrodes relative to the first and/or second static electrodes respectively, along an axis of the vacuum capacitor,
   wherein, in the variable vacuum capacitor,
   the first and second electrode assemblies are ganged along the axis such that the first mobile electrode assembly is offset along the axis by a gang offset distance from the second electrode assembly, and
   the variable vacuum capacitor comprises mobile electrode linkage means for providing a kinematic linkage between the one or more first mobile electrodes at a first position along the axis and the one or more second mobile electrodes at a second position along the axis, such that a first displacement along the axis of the one or more first mobile electrodes results in a second displacement along the axis of the one or more second mobile electrodes.

2. Variable vacuum capacitor according to claim 1, wherein the mobile electrode linkage means is arranged such that the magnitude of the second displacement is the same is the magnitude of the first displacement.

3. Variable vacuum capacitor according to claim 1, wherein the mobile electrode linkage means comprises electrical connection means for electrically connecting the one or more first mobile electrodes to the one or more second mobile electrodes.

4. Variable vacuum capacitor according to claim 1, wherein the displacement means comprises a motor outside the vacuum enclosure, and drive transmission means for transmitting a drive force of the motor through a wall of the vacuum enclosure to the one or more first mobile electrodes inside the vacuum enclosure.

5. Variable vacuum capacitor according to claim 4, comprising motor protection insulation for electrically insulating the motor against a high voltage on the one or more first mobile electrodes.

6. Variable vacuum capacitor according to claim 5, wherein the motor protection insulation is arranged between the drive transmission means and the one or more first mobile electrodes.

7. Variable vacuum capacitor according to claim 1, wherein
the one or more first mobile electrodes and the one or more first static electrodes are substantially cylindrical and coaxial with the axis, such that the one or more first mobile electrodes are at least partially interleaved with the one or more first static electrodes, and/or
the second mobile electrodes and the one or more second static electrode are substantially cylindrical and coaxial with the axis, such that the one or more second mobile electrodes are at least partially interleaved with the one or more second static electrodes.

8. Variable vacuum capacitor according to claim 1, wherein the one or more first mobile electrodes and the one or more first static electrodes are configured as spiral electrodes, and/or wherein the one or more second mobile electrodes and the one or more second static electrodes are configured as spiral electrodes.

9. Variable capacitor according to claim 7, wherein the mobile electrode linkage means comprises a substantially cylindrical, element arranged around the outside of the first electrode assembly and arranged coaxially with the one or more first mobile and one or more first static electrodes.

10. Variable capacitor according to claim 9, wherein the substantially cylindrical element is at least partially constructed from an electrode material and is arranged sufficiently close to an outer one of the one or more first static electrodes to function at least partially as one of the one or more first mobile electrodes.

11. Variable capacitor according to claim 9, wherein the substantially cylindrical element comprises open regions, and wherein one or more static electrode support elements extend from the first static electrodes, through the openings, to the wall of the vacuum enclosure.

12. Variable vacuum capacitor according to claim 1, comprising insulating parts made at least partially of a ceramic material.

13. Variable vacuum capacitor according to claim 1, comprising extensible vacuum sealing means extending between the first electrode assembly and the wall of the vacuum enclosure, the extensible vacuum sealing means being constructed with such a shape and of such materials that it behaves as an electrical insulator, at least when the variable vacuum capacitor is operating at a high voltage and/or at a high frequency.

14. Variable vacuum capacitor according to claim 1, wherein the one or more first static and the one or more first mobile electrodes have substantially the same dimensions and spatial configuration as the one or more second static and the one or more second mobile electrodes respectively.

* * * * *